US006909358B2

(12) United States Patent
Gass

(10) Patent No.: US 6,909,358 B2
(45) Date of Patent: Jun. 21, 2005

(54) HAMMING DISTANCE COMPARISON

(75) Inventor: Robert B. Gass, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 477 days.

(21) Appl. No.: 10/104,721

(22) Filed: Mar. 21, 2002

(65) Prior Publication Data

US 2003/0182603 A1 Sep. 25, 2003

(51) Int. Cl.[7] .................................................. G06K 9/12
(52) U.S. Cl. ................................................... 340/146.2
(58) Field of Search ............................... 340/146.2, 807; 714/712, 701, 714, 751, 755, 780, 781; 375/562, 265; 341/58

(56) References Cited

U.S. PATENT DOCUMENTS

| 4,119,946 A | * | 10/1978 | Taylor ......................... 382/222 |
| 5,295,091 A | * | 3/1994 | DeWit ......................... 708/801 |
| 5,491,479 A | | 2/1996 | Wilkinson .................... 341/58 |
| 5,818,362 A | | 10/1998 | Walker ......................... 341/57 |
| 5,951,711 A | | 9/1999 | Mahant-Shetti et al. .... 714/795 |
| 6,226,640 B1 | | 5/2001 | Ostrovsky et al. ............. 707/5 |

OTHER PUBLICATIONS

Lindell et al. "Configurable sparse distributed memory hardware implementation", Circuits and Systems, 1991, IEEE International Sympoisum on, Jun. 11–14, 1991, pp. : 3078–3081 vol. 5.*

Fujino et al. "An efficient Hamming distance comparator for low–power applications", Electronics, Circuits and Systems, 2002. 9th International Conference on, vol.: 2, Sep. 15–18, 2002, pp.: 641–644 vol. 2.*

F. Kagan Gurkaynak et al. "A Compact High–Speed Hamming Distance Comparator for Pattern Matching Applications," via Internet at http://turquoise.wpi.edu/EU-SIPCO98/, pp. 1–9.

* cited by examiner

*Primary Examiner*—Albert Decady
*Assistant Examiner*—James C Kerveros
(74) *Attorney, Agent, or Firm*—Robert A. Voigt, Jr.; Winstead Sechrest & Minick P.C.; Casimer K. Salys

(57) ABSTRACT

A method and system for performing hamming distance comparison. A hamming distance comparator may comprise a plurality of evaluation circuits where each evaluation circuit may be configured to evaluate a bit in a received data packet. Each evaluation circuit may comprise a first and a second capacitor configured to store a true and a complement value of a bit evaluated during a reset state. During an evaluation state, one of the first or second capacitors may be switched if the state of the bit evaluated changed state in a second subsequent received data packet. By switching one of the first or second capacitors, a net change in potential may be provided on a common line coupled to the first and second capacitors. The net change in potential on the common line provided by the evaluation circuits may be used to determine the hamming distance.

24 Claims, 6 Drawing Sheets

HAMMING DISTANCE COMPARISON

TECHNICAL FIELD

The present invention relates to the field of hamming distance comparison, and more particularly to performing hamming distance comparison without implementing explicit latches or Exclusive Or (XOR) gates using capacitive threshold logic.

BACKGROUND INFORMATION

In a typical data processing environment, data may be transmitted in multiple packets, e.g., words, from one element, e.g., cache, to another element, e.g., processor, over a bus, e.g., parallel bus. A hamming distance may refer to the number of non-matching bits, i.e., the number of bits that changed state, in two consecutively transmitted data packets. For example, a first 16-bit data word may be sent from a cache to a processor comprising of all 1's followed by a second data word of all 0's. In the above example, the hamming distance would be 16 representing that each bit in the consecutively transmitted data packets changed state. The hamming distance may be represented by a particular voltage which may then be compared to a threshold voltage level. If the hamming distance is above or below the threshold voltage, an activity may occur. Hamming distance comparison may be used in many applications including image processing and bus inversion.

Bus inversion may refer to transmitting the complement value of the data bits instead of the true value of the data bits when the number of bits to be switched is greater than half of the number of bits in the transmitted packet, e.g., word. Each time a bit changes state, a bus driver associated with that bit may be asserted to switch the state of the bit. Switching, however, consumes a significant amount of power. Consequently, it would be desirable to minimize switching activity. Bus inversion may be one method of minimizing at least in part switching activity. Bus inversion may minimize at least in part switching activity by transmitting the complement value of the data bits instead of the true value of the data bits when the number of bits to be switched is greater than half of the number of bits in the transmitted packet, e.g., word.

For example, a first data word may be sent from a cache to a processor with the binary value of 1111111111111111 followed by a second data word with the binary value of 0000000001111111. As illustrated, more than half of the bits in the second data word have changed in value with respect to the first data word. Instead of transmitting the true value of 0000000001111111 thereby switching nine bits, the value of 1111111110000000 may be transmitted thereby only switching seven bits. In conjunction with transmitting the complemented values, an extra bit commonly referred to as the inversion bit may be transmitted which indicates whether or not to invert the values of the transmitted data values One method of performing hamming distance comparison to perform bus inversion uses a hamming distance comparator as illustrated in FIG. 1. The hamming distance comparator of FIG. 1 may implement a Capacitor Threshold Logic (CTL) gate as discussed further below. CTL may refer to a dynamic circuit which requires a periodic refresh or precharge cycle, but unlike conventional dynamic Complementary Metal Oxide Semiconductor (CMOS) gates, the circuit may be operated in synchronous as well as in asynchronous mode.

Referring to FIG. 1, a hamming distance comparator 100 may be used to determine whether to invert the bus or not, i.e., implement bus inversion. Hamming distance comparator 100 may comprise a bus 101 coupled between one element, e.g., cache, and another element, e.g., processor, in a data processing system. Hamming distance comparator 100 may further comprise a plurality of latches 102A–D that may be used to maintain one of two states of a particular bit in a transmitted data packet. Latches 102A–D may collectively or individually be referred to as latches 102 or latch 102. For example, if the bits 1011 were transmitted on bus 101, then latch 102A may maintain the state, e.g., binary value of 1, for the least significant bit. Latch 102B may maintain the state, e.g., binary value of 1, for the bit adjacent to the least significant bit. Latch 102C may maintain the state, e.g., binary value of 0, for the bit second from the least significant bit. Latch 102D may maintain the state, e.g., binary value of 1, for the most significant bit. Exclusive-OR (XOR) gates 103A–D may each be connected to an input and an output of a corresponding latch 102A–D, respectively, in order to capture the present value and the past value of a particular bit. XOR gates 103A–D may collectively or individually be referred to as XOR gates 103 or XOR gate 103, respectively. By capturing the present and past value of a particular bit, XOR gate 103 may determine whether the value for that bit position changed in value from a first data transfer to a second data transfer. XOR gate 103 may logically output a "1" when the inputs to XOR gate 103 differ in state. Hence, when the value for a bit position changes, e.g., 0 to binary value of 1, then the corresponding XOR gate 103 may output a "1." When the value for a bit position does not change state, then the corresponding XOR gate 103 may output a "0."

Hamming distance comparator 100 may further comprise a CTL gate 110. CTL gate 110 may comprise CTL switches 104A–D coupled to XOR gates 103A–D, respectively. CTL switches 104A–D may collectively or individually be referred to as CTL switches 104 or CTL switch 104, respectively. CTL gate 110 may further comprise capacitors 105A–D coupled to CTL switches 104A–D, respectively. Capacitors 105A–D may collectively or individually be referred to as capacitors 105 or CTL capacitor 105, respectively. CTL gate 110 may further comprise a CTL comparator 107 coupled to each CTL capacitor 105A–D via a common line 106. CTL comparator 107 may be configured to change the state of the inversion bit used to indicate whether or not to transmit the complemented bit values in the received data packet based on the voltage level of common line 106. If the voltage level of common line 106 exceeds a threshold voltage established by CTL comparator 107, then CTL comparator 107 may be configured to change the state of the inversion bit to indicate to transmit the complemented bit values in the received data packet. If the voltage level of common line 106 falls below the threshold voltage established by CTL comparator 107, then CTL comparator 107 may be configured to not change the state of the inversion bit to indicate to transmit the true bit values in the received data packet. CTL gate 110 may further comprise a threshold column 108 coupled to common line 106. Threshold column 108 may be configured to adjust or shift the threshold voltage level, e.g., decrease threshold voltage level, established by CTL comparator 107 during a reset state. The amount of the adjustment or shift of the threshold voltage level may determine the number of CTL capacitors 105 that have to be charged up in order to activate CTL comparator 107 as described below.

Hamming distance comparator 100 may operate in two states commonly referred to as a reset state and an evaluation state. During the reset state, each CTL capacitor 105 may be discharged while a value of a bit on bus 101 is latched by the appropriate latch 102. During the evaluation state, CTL switch 104 may be configured to pass the value outputted by the associated XOR gate 103 to the associated CTL capacitor 105. As stated above, XOR gate 103 may logically output a "1" when the inputs to XOR gate 103 differ in state. Hence, when the value for a bit position changes, e.g., 0 to binary value of 1, then the corresponding XOR gate 103 may output a "1." When the value for a bit position does not change state, then the corresponding XOR gate 103 may output a "0." Upon CTL switch 104 passing the value outputted by the associated XOR gate 103 to the associated CTL capacitor 105, CTL capacitor 105 may charge up if the corresponding XOR gate 103 outputted a "1." When CTL capacitor 105 charges up, the voltage of common line 106 increases. If XOR gate 103 outputs a "0", then the associated CTL switch 104 passes a "0" to the associated CTL capacitor 105 thereby remaining discharged and not increasing the voltage of common line 106.

If the voltage level of common line 106 increases to above a predetermined threshold level, then CTL comparator 107 may change the state of the inversion bit to indicate to transmit the complemented bit values in the received data packet. In other words, if the number of bits that changed state in two consecutively transmitted data packets, i.e., the hamming distance, is greater than a certain number, then CTL comparator 107 may change the state of the inversion bit to indicate to transmit the complemented bit values in the received data packet. If the voltage level of common line 106 did not increase to above a predetermined threshold level, then CTL comparator 107 may not change the state of the inversion bit and hence indicate to send the true values in the received data packet. In other words, if the number of bits that changed state in two consecutively transmitted data packets, i.e., the hamming distance, is not greater than a certain number, then CTL comparator 107 may not change the state of the inversion bit and hence indicate to send the true values in the received data packet.

While the above hamming distance comparator implements hamming distance comparison to perform bus inversion, the hamming distance comparator comprises several levels of logic including latches and XOR gates. By having several levels of logic including latches and XOR gates, the complexity of the hamming distance comparator increases which increases costs and decreases performance.

It would therefore be desirable to perform hamming distance comparison without implementing explicit latches or Exclusive Or (XOR) gates using capacitive threshold logic.

SUMMARY

The problems outlined above may at least in part be solved in some embodiments by having each evaluation circuit in a hamming distance comparator be configured to evaluate a particular bit in a data packet received by the hamming distance comparator. Each evaluation circuit may comprise a first and a second capacitor configured to store a true and a complement value of the bit evaluated during a reset state. During an evaluation state, one of the first or second capacitors may be switched if the state of the bit evaluated in the received data packet changed in a second subsequent received data packet. By switching one of the first or second capacitors, a net change in potential may be provided on a common line coupled to the first and second capacitors. If the state of the bit evaluated in the received data packet did not change state in a second subsequent received data packet, then there is no switching of the first and second capacitors. When there is no switching of the first and second capacitors, there is not a net change in potential provided on the common line. If enough of the evaluation circuits produce a net change in the voltage of the common line so that the voltage of the common line shifts across a threshold voltage, then a Capacitor Threshold Logic (CTL) comparator may be asserted. That is, if the hamming distance which may refer to the number of bits that changed state in two consecutive data packets received by the hamming distance comparator is greater than a particular number, then the CTL comparator may be asserted.

In one embodiment of the present invention, a method for performing hamming distance comparison may comprise the step of a hamming distance comparator receiving a first packet of data comprising a plurality of bits of data, e.g., binary values of 11100. The hamming distance comparator may comprise a plurality of evaluation circuits where each evaluation circuit may be configured to evaluate a particular bit in a particular bit position in the data packet received by the hamming distance comparator. Each evaluation circuit may comprise a first and a second capacitor. During a reset state, a first value may be stored at the first capacitor and a second value may be stored at the second capacitor where the second value is a complement of the first value. For example, if the evaluation circuit received a "0", then a "0" may be stored at the first capacitor and a "binary value of 1" may be stored at the second capacitor during the reset state. If the evaluation circuit received a "binary value of 1", then a "binary value of 1" may be stored at the first capacitor and a "0" may be stored at the second capacitor during the reset state.

The hamming distance comparator may then receive a second packet of data comprising a plurality of bits of data, e.g., binary values of 00000. As stated above, each evaluation circuit may evaluate a particular bit in a particular bit position in the data packet received by the hamming distance comparator.

A determination may then be made by the evaluation circuit as to whether the value at the bit evaluated in the second data packet differs with the first value where the bit evaluated in the second data packet corresponds to the same bit position as the bit in the first data packet with the first value. That is, a determination may be made by the evaluation circuit as to whether the bit evaluated in the first data packet changed state with respect to the bit in the same bit position in the second data packet received by the hamming distance comparator.

If the bit evaluated in the first data packet changed state with respect to the state of the bit in the same bit position in the second data packet received by the hamming distance comparator, then one of the first or second capacitors may switch thereby producing a net change, e.g., increase or decrease, in potential on a common line coupled to the first and second capacitors.

If the bit evaluated in the first data packet did not change state with respect to the state of the bit in the same bit position in the second data packet received by the hamming distance comparator, then one of the first or second capacitors may not switch thereby not producing a net change, e.g., increase or decrease, in potential on the common line.

Upon each evaluation circuit evaluating whether a bit in the first data packet changed state with respect to the bit in the same bit position in the second data packet received by the hamming distance comparator, a determination may be made as to whether there is a net change in potential on the common line that shifts across, e.g., exceeds or falls below, a threshold. That is, a determination may be made as to whether the hamming distance, i.e., the number of non-matching bits in two consecutively received data packets, exceeds a particular number.

If there is a net change in potential on the common line that shifts across a threshold, then a comparator is activated. If there is not a net change in potential on the common line that shifts across a threshold, then the comparator is not activated.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

Although the present invention is described with reference to specific embodiments of a hamming distance comparator performing hamming distance comparison to implement bus inversion, it is noted that the hamming distance comparator of the present invention may perform hamming distance comparison used in other applications, e.g., image processing. It is further noted that a person of ordinary skill in the art would be capable of implementing the hamming distance comparator of the present invention to perform hamming distance comparison in other applications, e.g., image processing. It is further noted that embodiments implementing the hamming distance comparator of the present invention to perform hamming distance comparison in other applications, e.g., image processing, would fall within the scope of the present invention.

Figure 2:
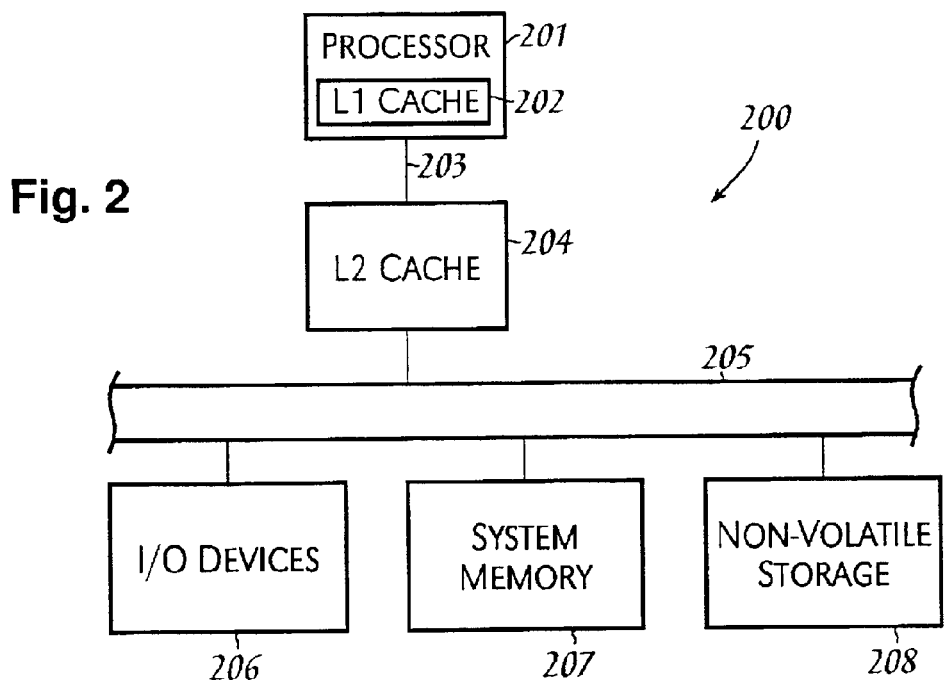
FIG. 2 illustrates a processor system configured in accordance with the present invention.

FIG. 2—Processor System

FIG. 2 illustrates an embodiment of a processor system 200 in accordance with the present invention. System 200 may comprise a processor 201 configured to execute instructions. Processor 201 may include a level one (L1) cache 202 which temporarily stores instructions and data that are likely to be accessed by processor 201. Although L1 cache 202 is illustrated in FIG. 2 as a unified cache that stores both instructions and data (both hereinafter simply referred to as data), those skilled in the art will appreciate that L1 cache 202 may alternatively be implemented as a bifurcated instruction and data cache.

In order to minimize data access latency, system 200 may also include one or more additional levels of cache memory, such as level two (L2) cache 204, which is utilized to store data to L1 cache 202. L2 cache 204 may be coupled to processor 201 via bus 203. L2 cache 204 may be further coupled to an interconnect 205, e.g., one or more buses, cross-point switch. L2 cache 204 may function as an intermediate storage unit between a system memory 207 coupled to interconnect 205 and L1 cache 202, and may store a much larger amount of data than L1 cache 202, but at a longer access latency. For example, L2 cache 204 may have a storage capacity of 256 or 512 kilobytes, while L1 cache 202 may have a storage capacity of 64 or 128 kilobytes. Processor 201 may further be supported by a lookaside level three (L3) cache (not shown) which is connected to bus 203 in parallel with L2 cache 204 and preferably has a storage capacity equal to or greater than L2 cache 204.

As illustrated, system 200 may further comprise Input/Output (I/O) devices 206, system memory 207 and a non-volatile storage unit 208, which are each coupled to interconnect 205. I/O devices 206 may comprise conventional peripheral devices, e.g., display device, keyboard, graphical pointer, which may be interfaced with interconnect 205 via conventional adapters. Non-volatile storage 208 may store an operating system and other software, which may be loaded into volatile system memory 207 in response to system 200 being powered on. It is noted that those skilled in the art would appreciate that system 200 may include many additional components that are not shown in FIG. 2, such as serial and parallel ports for connection to networks or attached devices, a memory controller that regulates access to system memory 207, etc. It is further noted that system 200 may comprise any number of processors 201 associated with any levels of cache. It is further noted that FIG. 2 is illustrative and is not meant to imply architectural limitations.

Referring to FIG. 2, packets of data, e.g., words, may be transmitted from one element, e.g., L2 cache 204, to another element, e.g., processor 201. As stated in the Background Information section, a hamming distance may refer to the number of non-matching bits, i.e., the number of bits that changed state, in two consecutively transmitted data packets. A description of performing hamming distance comparison on packets of data, e.g., words, transmitted from one element, e.g., L2 cache 204, to another element, e.g., processor 201, in system 200 is described further below in conjunction with FIGS. 3–5.

Figure 1:
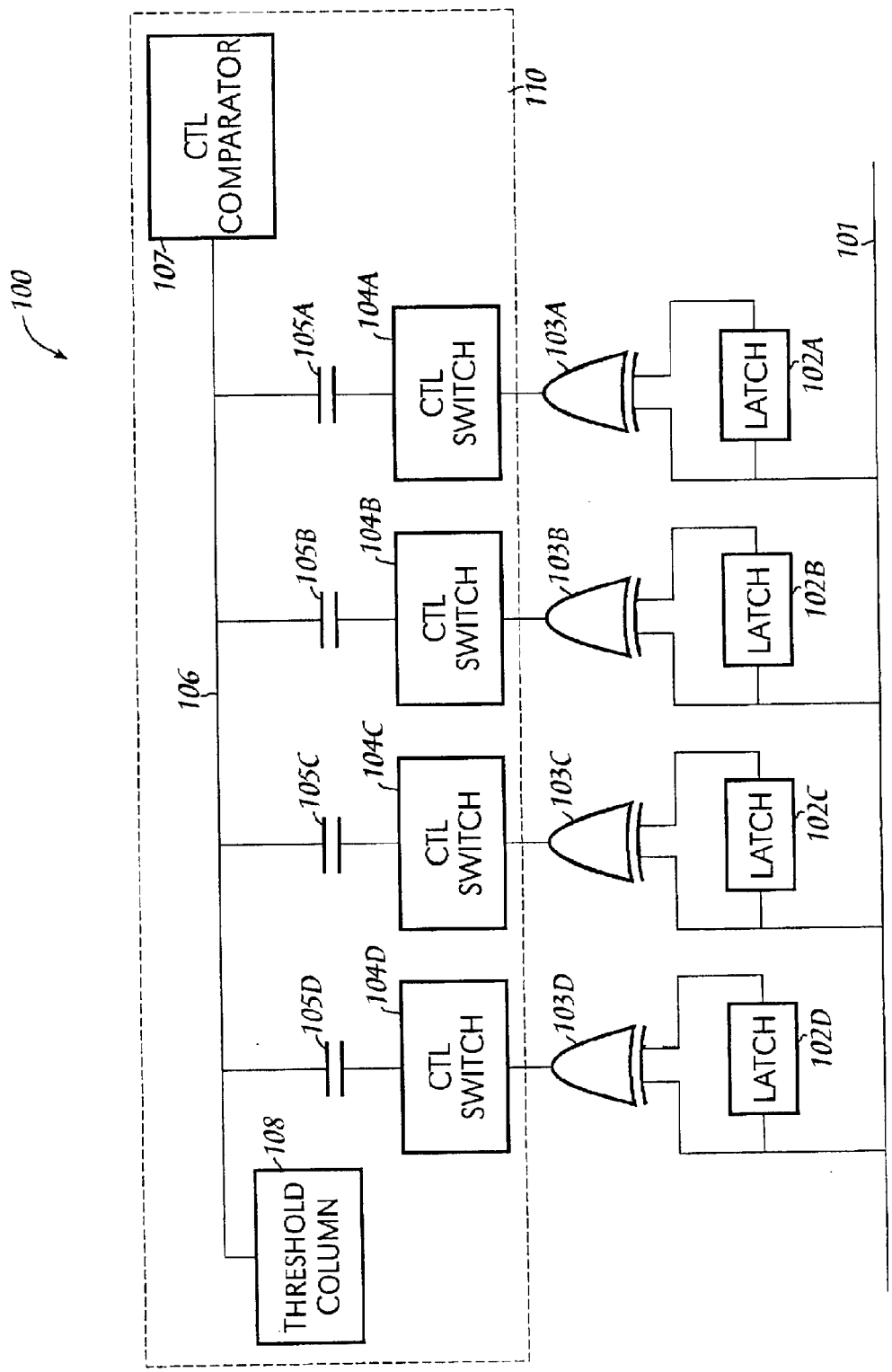
FIG. 1 illustrates a hamming distance comparator implementing bus inversion.

Furthermore, as stated in the Background Information section, the hamming distance comparator as illustrated in FIG. 1, implementing hamming distance comparison to perform bus inversion, comprises several levels of logic including latches and XOR gates. By having several levels of logic including latches and XOR gates, the complexity of the hamming distance comparator increases which increases costs and decreases performance. It would therefore be desirable to perform hamming distance comparison without implementing explicit latches or Exclusive Or (XOR) gates using capacitive threshold logic. An embodiment of a system using a hamming distance comparator to perform hamming distance comparison without implementing explicit latches or XOR gates is described below in conjunction with FIGS. 3–5. It is noted that even though the following discusses using the hamming distance comparator of the present invention to perform hamming distance comparison to implement bus inversion that the hamming distance comparator of the present invention may perform hamming distance comparison to be used in other applications, e.g., image processing. It is further noted that a person of ordinary skill in the art would be capable of applying the principles of the present invention of performing hamming distance comparison using the hamming distance comparator of the present invention in other applications, e.g., image processing.

Figure 3:
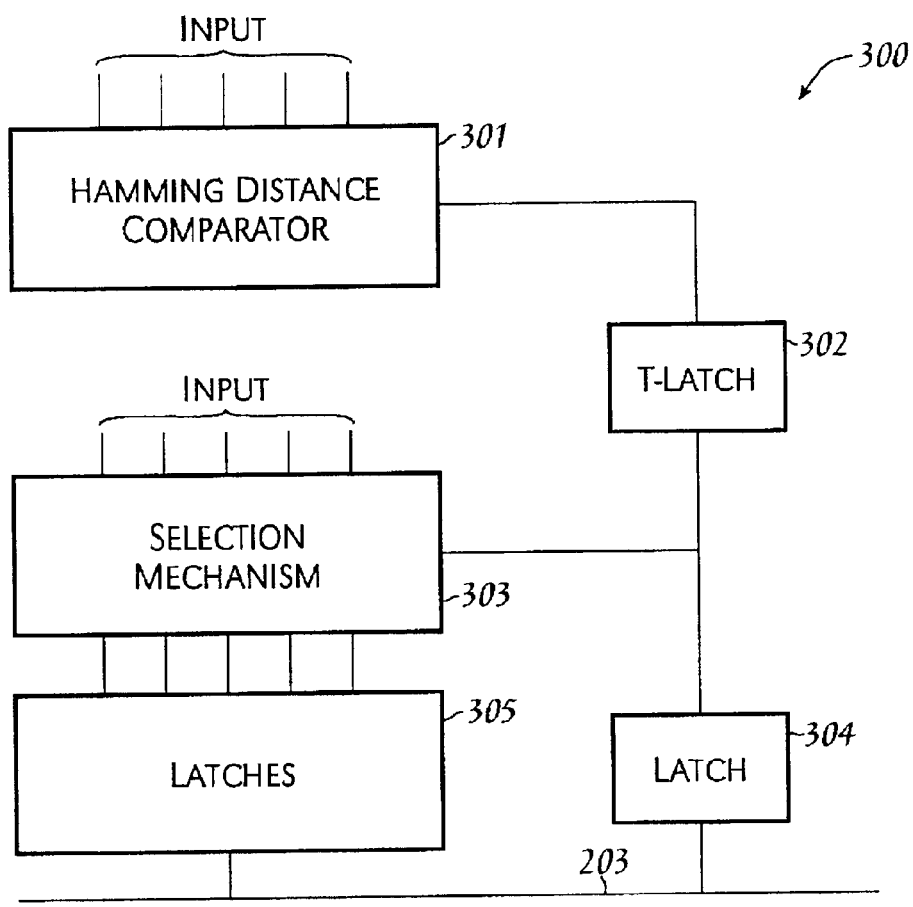
FIG. 3 illustrates an embodiment of the present invention of a system implementing bus inversion using a hamming distance comparator to perform hamming distance comparison.

FIG. 3—System for Implementing Bus Inversion

FIG. 3 illustrates an embodiment of the present invention of a system 300 implementing bus inversion using a hamming distance comparator of the present invention to perform hamming distance comparison. System 300 may comprise a hamming distance comparator 301 configured to receive packets of data. A more detailed description of hamming distance comparator 301 is described below in conjunction with FIG. 4. Hamming distance comparator 301 may be coupled to a toggle latch 302 configured to "toggle" the state of its output used as an inversion bit. The inversion bit may be used to indicate whether or not to invert the data packet received by hamming distance comparator 301. Hamming distance comparator 301 may be configured to assert toggle latch 302 which toggles the state of its output when the hamming distance exceeds a certain number as discussed in greater detail in conjunction with FIGS. 4–5. Toggle latch 302 may be coupled to a selection mechanism 303, e.g., multiplexor, that receives both the inversion bit and the true and complemented values of the data packet received by hamming distance comparator 301. Selection mechanism 303 may be coupled to latches 305 configured to receive the output of selection mechanism. Toggle latch 302 may further be coupled to a latch 304 configured to receive the inversion bit from toggle latch 302. Latches 305 and latch 304 may be coupled to a bus, e.g., bus 203, in processor system 200 (FIG. 2) used to transfer data from one element, e.g., L2 cache 204 (FIG. 2), to another element, e.g., processor 201 (FIG. 2). It is noted that those of ordinary skill in the art will appreciate that different elements in FIG. 3 may be used to implement bus inversion. It is further noted that FIG. 3 is illustrative and not meant to imply any architectural limitations.

Referring to FIG. 3, selection mechanism 303 may be configured to determine whether or not to transmit the complement or true values of the data packet received by hamming distance comparator 301 based on the state of the inversion bit. For example, selection mechanism 303 may be configured to transmit the complemented values of the data packet received hamming distance comparator 301 to latches 305 if the inversion bit has changed state. Selection mechanism 303 may be configured to transmit the true values of the data packet received by hamming distance comparator 301 to latches 305 if the inversion bit has not changed state. Upon receiving the appropriate data packet from selection mechanism 303, latches 305 may be configured to drive the received data packet to bus 203 via a driver (not shown) in the output buffer (not shown) of latches 305. Furthermore, latch 304, upon receiving the inversion bit, may be configured to drive the received inversion bit to bus 203 via a driver (not shown) in the output buffer (not shown) of latch 304.

Figure 4:
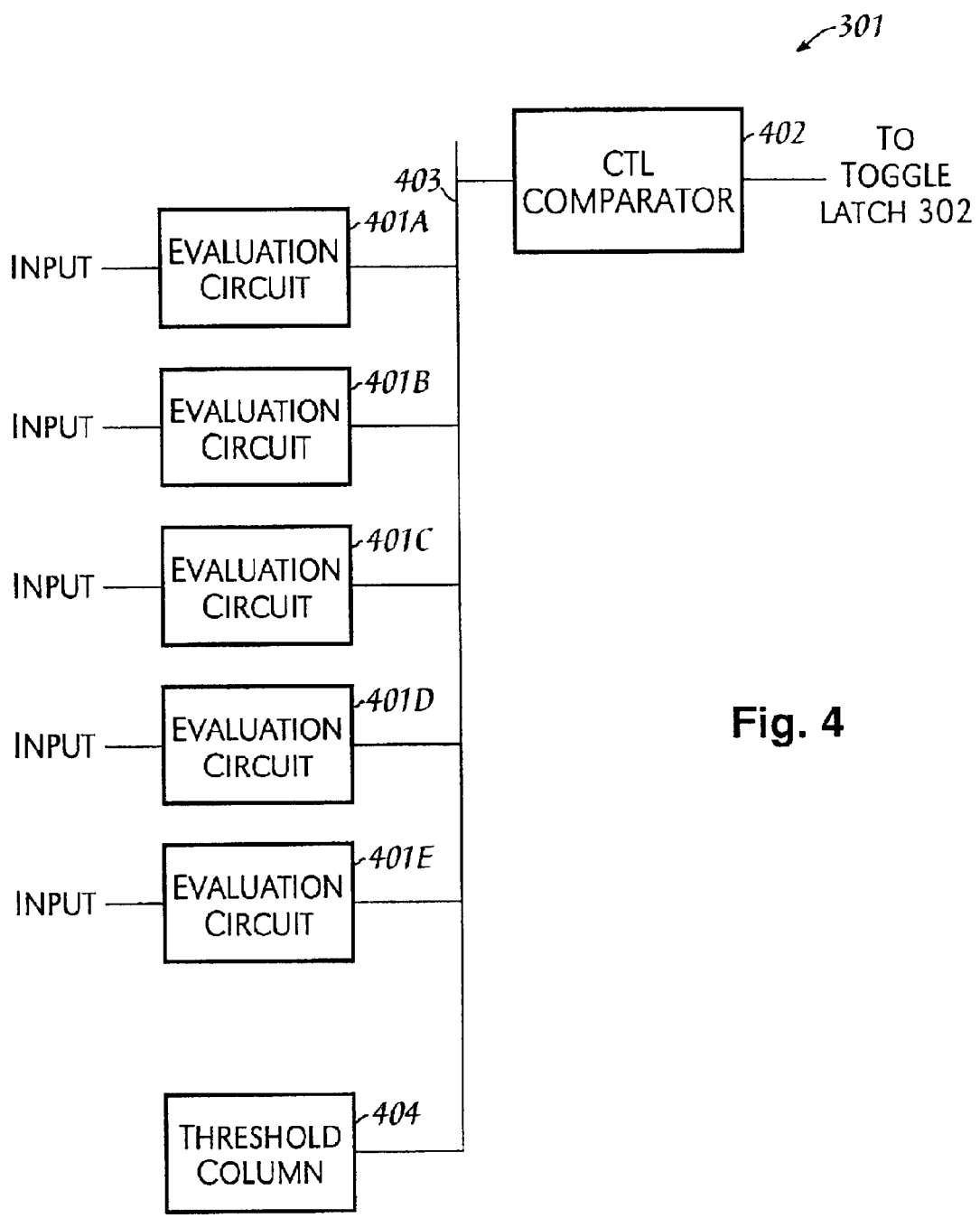
FIG. 4 illustrates the hamming distance comparator configured in accordance with the present invention.

FIG. 4—Hamming Distance Comparator

FIG. 4 illustrates an embodiment of the present invention of hamming distance comparator 301. Hamming distance comparator 301 may comprise a plurality of evaluation circuits 401A–E coupled to a CTL comparator 402 via a common line 403. Evaluation circuits 401A–E may collectively or individually be referred to as evaluation circuits 401 or evaluation circuit 401, respectively. A more detailed description of evaluation circuit 401 is discussed further below in conjunction with FIG. 5. Hamming distance comparator 301 may further comprise a threshold column 404 configured to adjust or shift the threshold voltage, e.g., increase or decrease the threshold voltage level, established by CTL comparator 402 during a reset state. The amount of the adjustment or shift of the threshold voltage level may determine the number of evaluations circuits 401 that may have to produce a net change of potential on common line 403 as described in greater detail further below. It is noted that there are many different configurations for threshold column 404 to adjust or shift the threshold voltage determined by CTL comparator 402 during the reset state. It is further noted that these configurations for threshold column 404 are well known in the art and therefore will not be described in detail for the sake of brevity. It is further noted that a person of ordinary skill in the art would be capable of implementing any of these configurations for threshold column 404 to adjust or shift the threshold voltage determined by CTL comparator 402 during the reset state.

Referring to FIG. 4, each evaluation circuit 401 may be configured to evaluate whether a bit in a particular bit position in a data packet received by hamming distance comparator 301 changed state with respect to the state of the bit in the same bit position in the previously received data packet. If the evaluated bit changed state, then evaluation circuit 401 may be configured to produce a net change, e.g., increase or decrease, in the voltage of common line 403. If, however, the evaluated bit did not change state with respect to the state of the bit in the same bit position in the previously received data packet, then evaluation circuit 401 may be configured to not produce a net change in the voltage of common line 403. A more detailed description of evaluation circuit 401 determining whether the state of a bit in a particular bit position changed state with respect to the state of the bit in the same bit position in the previously received data packet is provided further below in conjunction with FIG. 5.

As stated above, threshold column 404 may be configured to adjust or shift the threshold voltage of CTL comparator 402 during a reset state. If greater than a particular number of evaluation circuits 401 produce a net change, e.g., increase or decrease, in the voltage of common line 403 so that the voltage of common line 403 shifts across the threshold voltage, i.e., exceeds or falls below the threshold voltage, then CTL comparator 402 may be asserted. That is, if the number of bits that changed state in two consecutive data packets received by hamming distance comparator 301, i.e., the hamming distance, is greater than a certain number, then CTL comparator 402 may be asserted. By asserting CTL comparator 402, CTL comparator 402 asserts toggle latch 302 to toggle the state of its output used as an inversion bit as discussed above. If, however, evaluation circuits 401 do not produce a net change, e.g., increase or decrease, in the voltage of common line 403 so that the voltage of common line 403 does not shift across the threshold voltage, then CTL comparator 402 may not be asserted. That is, if the number of bits that changed state in two consecutive data packets received by hamming distance comparator 301, i.e., the hamming distance, is not greater than a certain number, then CTL comparator 402 may not be asserted. By not asserting CTL comparator 402, CTL comparator 402 does not assert toggle latch 302 thereby not toggling the state of its output used as an inversion bit.

Figure 5:
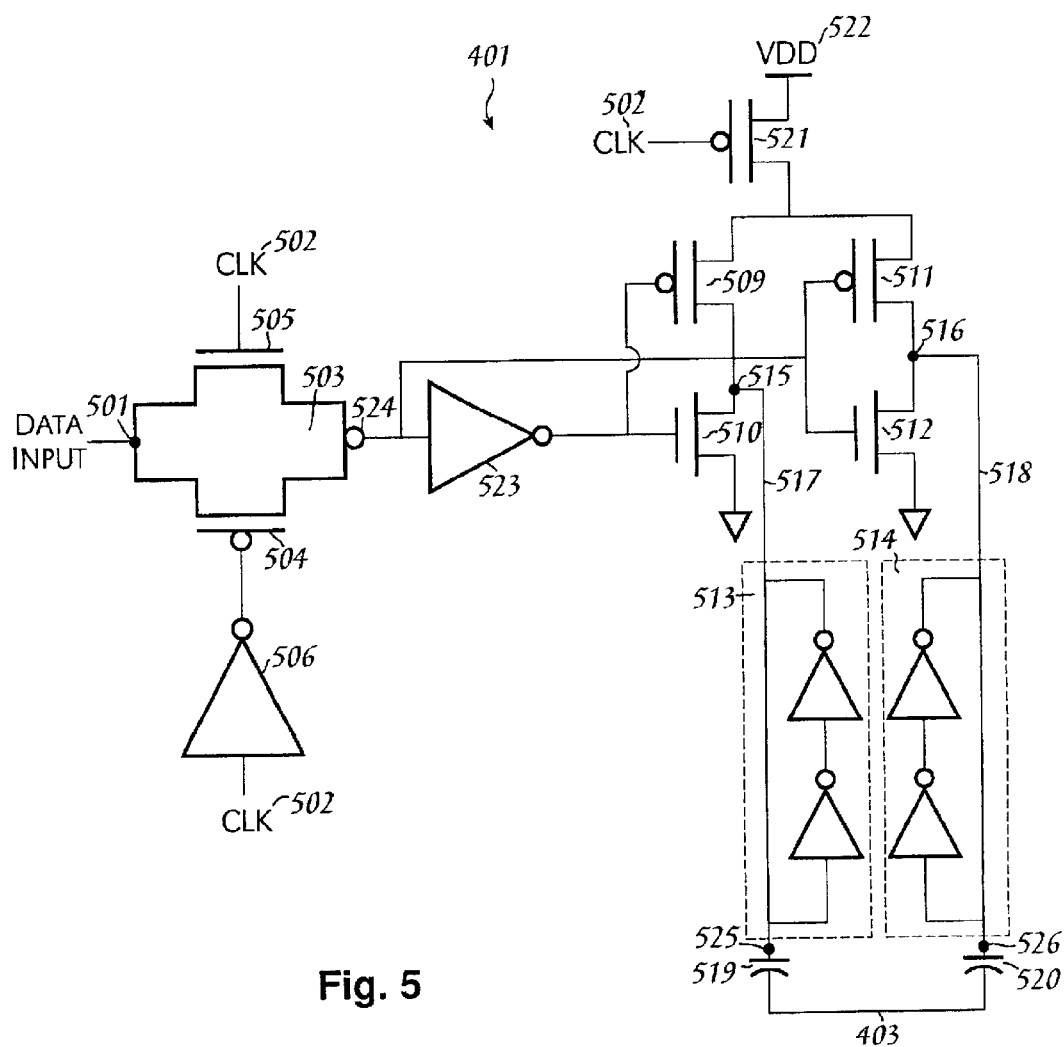
FIG. 5 illustrates an evaluation circuit of the hamming distance comparator configured in accordance with the present invention.

FIG. 5—Evaluation Circuit

FIG. 5 illustrates an embodiment of the present invention of evaluation circuit 401 configured to evaluate whether a bit in a data packet received by hamming distance comparator 301 changed state with respect to the state of the bit in the same bit position in a previously received data packet.

Referring to FIG. 5, evaluation circuit 401 may receive as input at node 501 a particular bit in the data packet received by hamming distance comparator 301. For example, referring to FIG. 4, if hamming distance comparator 301 received the bits 11100 in a data packet, then bit "1" in the most significant bit position may be received by evaluation circuit 401A. Bit "1" in the second to the most significant bit position may be received by evaluation circuit 401B. Bit "1" in the third to the most significant bit position may be received by evaluation circuit 401C. Bit "0" in the second to the least significant bit position may be received by evaluation circuit 401D and so forth.

Returning to FIG. 5, evaluation circuit 401 may comprise a clock signal 502 that is inputted to nodes of a transmission gate 503. A transmission gate may refer to two transistors of opposite types, e.g., p-type, n-type, coupled to one another. For example, transmission gate 503 may comprise an n-type transistor 505 coupled to a p-type transistor 504. Evaluation circuit 401 may further comprise an inverter 506 coupled between p-type transistor 504 and clock signal 302 thereby enabling both n-type 505 and p-type transistor 505 to be activated substantially concurrently. By activating transistors 504, 505 substantially concurrently, the state of the input data bit may be maintained during the reset phase as explained in greater detail further below.

Evaluation circuit 401 may further comprise a p-type transistor 509 coupled to an n-type transistor 510. Transistors 509 and 510 may both receive the complement of the value at node 524 via inverter 523 coupled to transistor 510. Furthermore, evaluation circuit may comprise a p-type transistor 511 coupled to an n-type transistor 512. Transistors 511 and 512 may both receive the true value at node 524. N-type transistors 510, 512 may be coupled to ground. P-type transistors 509, 511 may be coupled to the output of transistor 521 coupled to power, VDD 522. Transistor 521 may further be coupled to clock signal 502. Evaluation circuit 401 may further comprise full keepers 513, 514 coupled to nodes 515, 516 via lines 517, 518, respectively. Evaluation circuit 401 may further comprise CTL capacitors 519, 520 coupled to lines 517, 518, respectively. Full keepers 513, 514 may be configured to maintain the value charged on CTL capacitors 519, 520, respectively, not being used during the evaluation state as explained in greater detail further below. The output of CTL capacitors 519, 520 may be coupled to common line 403 (FIG. 4). It is noted that FIG. 5 is illustrative of an exemplary embodiment of using two CTL capacitors 519, 520 to indicate if a bit evaluated had changed state. It is further noted that it would be understood to a person of ordinary skill in the art that alternative embodiments implementing other combinations of logic circuitry such as transmission gates, inverters, full keepers, transistors, etc., in addition to the two CTL capacitor 519, 520, may be used to perform the functions representative of the present inventive principles. It is further noted that embodiments implementing such combinations of logic would fall within the scope of the present invention.

Evaluation circuit 401 may operate in two states commonly referred to as a reset state and an evaluation state. During the reset state, clock signal 502 is deasserted, i.e., has a zero value. Upon deasserting clock signal 502, transmission gate 503 is deasserted thereby preventing the state of the bit, e.g., binary value of "1", at node 501 from being transmitted across transmission gate 503. Furthermore, the previous state value, e.g., "0", of the bit evaluated by evaluation circuit 401 may be maintained at node 524 due to the capacitive effect of inverter 523 and transistors 511, 512.

If the state of the previous bit was a "0", then transistor 509 is deactivated and transistor 510 is activated. Upon activating transistor 510, a voltage at node 525 of CTL capacitor 519 approaches zero. Furthermore, if the state of the previous bit was a "0", then transistor 511 is activated and transistor 512 is deactivated. Since during the reset state, clock 502 is deasserted, transistor 521 is activated. Upon activating transistors 521, 511, the voltage at node 526 of CTL capacitor 520 is charged up to a potential substantially equal to VDD.

If, however, the state of the previous bit was a "binary value of 1", then transistor 509 is activated and transistor 510 is deactivated. As stated above, during the reset state, clock 502 is deasserted. When clock 502 is deasserted, transistor 521 is activated. Upon activating transistors 521, 509, node 525 of CTL capacitor 519 is charged up to a potential substantially equal to VDD. Furthermore, if the state of the previous bit was a "binary value of 1", then transistor 511 is deactivated and transistor 512 is activated. Upon activating transistor 512, the voltage at node 526 of CTL capacitor 520 approaches zero.

Hence, during the reset state, the previous state of the bit evaluated by evaluation circuit 401 appears at node 525 of CTL capacitor 519 and the complement of the previous state appears at node 526 of CTL capacitor 520.

During the evaluation state, clock signal 502 is asserted, i.e., has a binary value of "1." Upon asserting clock signal 502, transmission gate 503 is asserted thereby transmitting the current state of the bit, e.g., binary value of "1", at node 501 across transmission gate 503 to node 524.

If during the reset state, the voltage at node 525 of CTL capacitor 519 was substantially zero and the voltage at node 526 of CTL capacitor 520 was substantially VDD, then the following may occur during the evaluation state.

If the present state of the bit evaluated was a binary value of "1", then a binary value of "1" may appear at node 524 as described above. Consequently, transistor 509 becomes activated and transistor 510 becomes deactivated. Since transistor 521 is deactivated by asserting clock signal 502 during the evaluation state, the potential at node 525 of CTL capacitor 519 remains zero. Furthermore, if the binary value of "1" appears at node 524 during the evaluation state, transistor 511 is deactivated and transistor 512 is activated thereby discharging node 526 of CTL capacitor 520. Hence, the potential at nodes 525, 526 of CTL capacitors 519, 520, respectively, are substantially zero thereby producing a net change of potential, e.g., decrease in potential, on common line 403. Therefore, when the state of a bit in a particular bit position changes state, e.g., changes from the state of "0" to the state of "1", a net change of potential, e.g., increase or decrease in potential, may be produced on common line 403 by evaluation circuit 401 evaluating that particular bit position.

If, however, the present state of the bit evaluated was a binary value of "0", then a binary value of "0" may appear at node 524 as described above. Consequently, transistor 509 becomes deactivated and transistor 510 becomes activated. Subsequently, the potential at node 525 of CTL capacitor 519 remains substantially zero. Furthermore, if the binary value of "0" appears at node 524 during the evaluation state, transistor 511 is activated and transistor 512 is deactivated. Since transistor 521 is deactivated by asserting clock signal 502 during the evaluation state, the potential at node 526 of CTL capacitor 519 remains substantially VDD. Hence, the potential at nodes 525, 526 of CTL capacitors 519, 520, respectively, remain the same as during the reset state thereby not producing a net change of potential, e.g., increase or decrease in potential, on common line 403. Therefore, when the state of a bit in a particular bit position does not change state, e.g., consecutive states of "0", a net change of potential, e.g., increase or decrease in potential, may not be produced on common line 403 by evaluation circuit 401 evaluating that particular bit position.

If, however, during the reset state, the voltage at node 525 of CTL capacitor 519 was substantially VDD and the voltage at node 526 of CTL capacitor 520 was substantially zero, then the following may occur during the evaluation state.

If the present state of the bit evaluated was a binary value of "1", then a binary value of "1" may appear at node 524 as described above. Consequently, transistor 509 becomes activated and transistor 510 becomes deactivated. Since transistor 521 is deactivated by asserting clock signal 502 during the evaluation state, the potential at node 525 of CTL capacitor 519 remains VDD. Furthermore, if the binary value of "1" appears at node 524 during the evaluation state, transistor 511 is deactivated and transistor 512 is activated. Subsequently, the potential at node 526 of CTL capacitor 520 remains substantially zero. Hence, the potential at nodes 525, 526 of CTL capacitors 519, 520, respectively, remain the same as during the reset state thereby not producing a net change of potential, e.g., increase or decrease in potential, on common line 403. Therefore, when the state of a bit in a particular bit position does not change state, e.g., consecutive states of "1", a net change of potential, e.g., increase or decrease in potential, may not be produced on common line 403 by evaluation circuit 401 evaluating that particular bit position.

If, however, the present state of the bit evaluated was a binary value of "0", then a binary value of "0" may appear at node 524 as described above. Consequently, transistor 509 becomes deactivated and transistor 510 becomes activated thereby discharging node 525 of CTL capacitor 519. Furthermore, if the binary value of "0" appears at node 524 during the evaluation state, transistor 511 is activated and transistor 512 is deactivated. Since transistor 521 is deactivated by asserting clock signal 502 during the evaluation state, the potential at node 525 of CTL capacitor 519 remains substantially zero. Hence, the potential at nodes 525, 526 of CTL capacitors 519, 520, respectively, are substantially zero thereby producing a net change of potential, e.g., increase or decrease in potential, on common line 403. Therefore, when the state of a bit in a particular bit position changes state, e.g., changes from the state of "1" to the state of "0", a net change of potential, e.g., decrease in potential, may be produced on common line 403 by evaluation circuit 401 evaluating that particular bit position.

It is noted that even though evaluation circuit 401 may be configured to produce a net decrease in potential on common line 403 when the state of a bit in a particular bit position changes state, evaluation circuit 401 may be configured to produce a net increase in potential on common line 403 when the state of a bit in a particular bit position changes state. It is further noted that a person of ordinary skill in the art would be capable of complementing evaluation circuit 401 as described above to produce a net increase in potential on common line 403 when the state of a bit in a particular bit position changes state. It is further noted that such embodiments producing a net increase in potential on common line 403 when the state of a bit in a particular bit position changes state would fall within the scope of the present invention.

Figure 6:
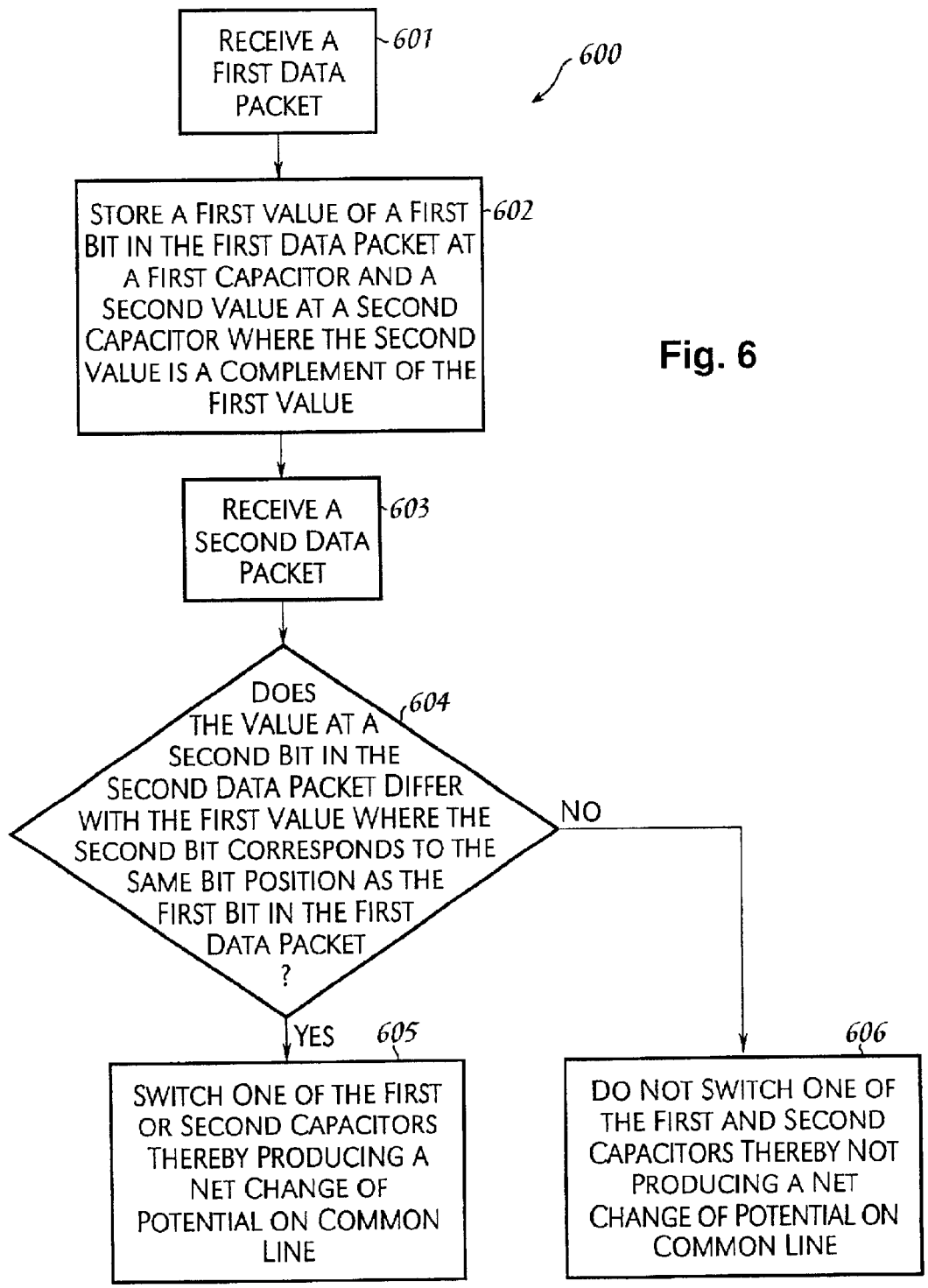
FIG. 6 is a flowchart of a method for the evaluation circuit producing a net change in potential on a common line if a bit changed state with respect to the state of the bit in a data packet previously received by the hamming distance comparator in accordance with the present invention.

FIG. 6—Method for Producing a Net Change in Potential on a Common Line

Figure 7:
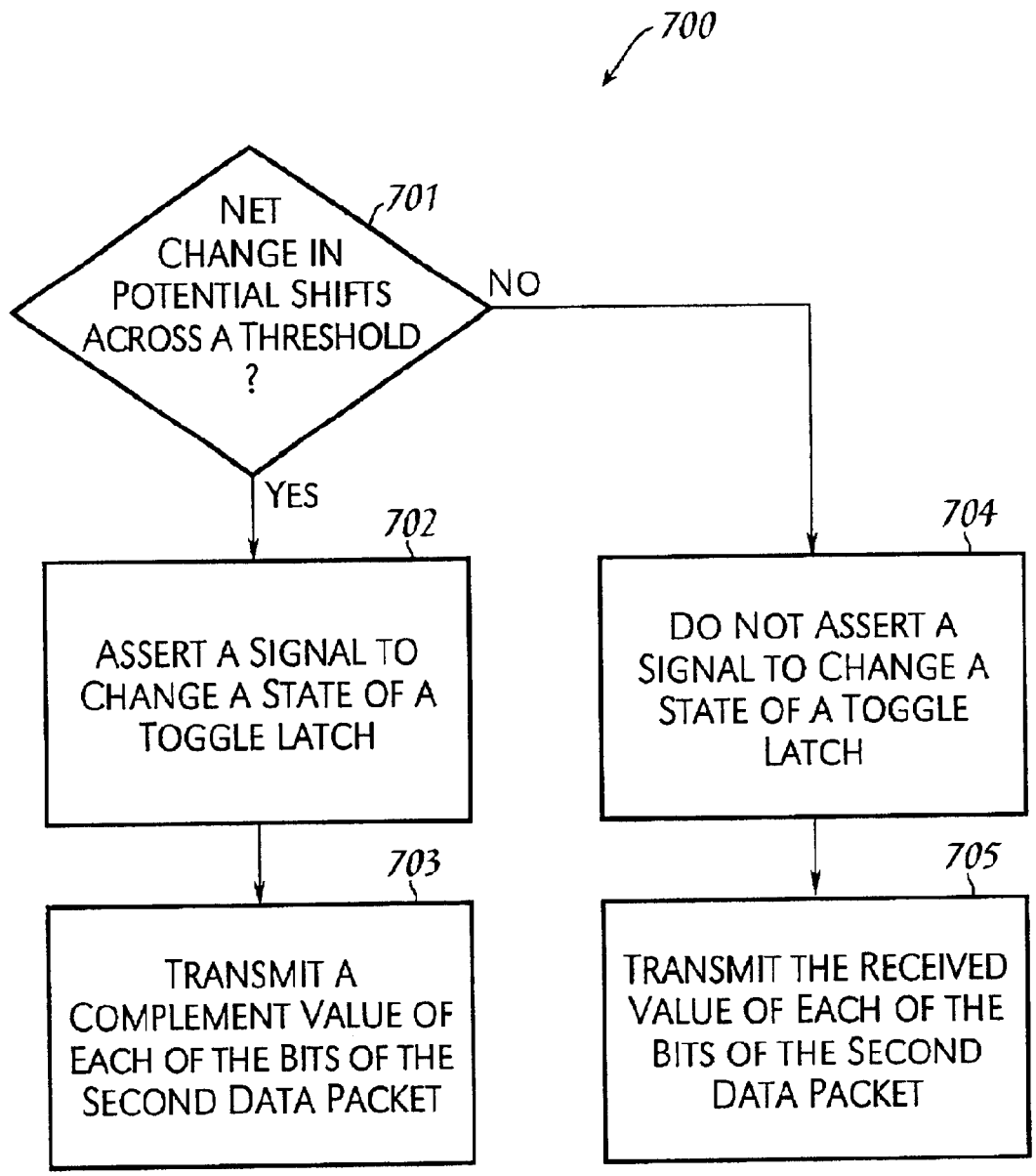
FIG. 7 is a flowchart of a method for performing hamming distance comparison to implement bus inversion in accordance with the present invention.

FIG. 6 is a flowchart of one embodiment of the present invention of a method 600 for evaluation circuit 401 (FIGS. 4 and 5) producing a net change in potential on a common line 403 (FIG. 4) if a bit changed state with respect to the state of the bit in a previously received data packet thereby enabling hamming distance comparison to be performed as described in FIG. 7.

Referring to FIG. 6, in conjunction with FIGS. 3–5, in step 601, hamming distance comparator 301 may receive a first packet of data comprising a plurality of bits of data, e.g., binary values of 11100. As stated above, each evaluation circuit 401 may receive as input at node 501 a particular bit in the data packet received by hamming distance comparator 301. For example, referring to FIG. 4, if hamming distance comparator 301 received the bits 11100 in a data packet, then bit "1" in the most significant bit position may be received by evaluation circuit 401A. Bit "1" in the second to the most significant bit position may be received by evaluation circuit 401B. Bit "1" in the third to the most significant bit position may be received by evaluation circuit 401C. Bit "0" in the second to the least significant bit position may be received by evaluation circuit 401B and so forth. It is noted that the following steps of method 600, e.g., steps 602-606, describe the steps performed by a particular evaluation circuit 401. It is further noted that the following steps, e.g., steps 602–606, may apply to each particular evaluation circuit 401 in hamming distance comparator 301 evaluating whether the state of a bit in the same bit position in two consecutively received data packets by hamming distance comparator 301 changed state.

In step 602, a first value at a first capacitor 519 and a second value at a second capacitor 520 may be stored where the second value is a complement of the first value. For example, as described above, if a particular evaluation circuit 401 received a "0", then a "0" may be stored at capacitor 519 and a "binary value of 1" may be stored at capacitor 520 during the reset state. If a particular evaluation circuit 401 received a "binary value of 1", then a "binary value of 1" may be stored at capacitor 519 and a "0" at capacitor 520 during the reset state.

In step 603, hamming distance comparator 301 may receive a second packet of data comprising a plurality of bits of data, e.g., binary values of 00000. As stated above, each evaluation circuit 401 may receive as input at node 501 a particular bit in the data packet received by hamming distance comparator 301. For example, referring to FIG. 4, if hamming distance comparator 301 received the bits 00000 in a data packet, then bit "0" in the most significant bit position may be received by evaluation circuit 401A. Bit "0" in the second to the most significant bit position may be received by evaluation circuit 401B. Bit "0" in the third to the most significant bit position maybe received by evaluation circuit 401C and so forth.

In step 604, a determination may be made by evaluation circuit 401 as to whether the first value differs with the bit evaluated in the second data packet where the bit evaluated in the second data packet corresponds to the same bit position as the bit in the first data packet with the first value. That is, a determination may be made by evaluation circuit 401 as to whether the bit evaluated in the first data packet changed state with respect to the bit in the same bit position in the second data packet received by hamming distance comparator 301.

If the bit evaluated in the first data packet changed state with respect to the state of the bit in the same bit position in the second data packet received by hamming distance comparator 301, then, in step 605, one of the first or second capacitors 519, 520 may switch thereby producing a net change, e.g., increase or decrease, in potential on common line 403 as described above.

If the bit evaluated in the first data packet did not change state with respect to the state of the bit in the same bit position in the second data packet received by hamming distance comparator 301, then, in step 606, one of the first or second capacitors 519, 520 may not switch thereby not producing a net change, e.g., increase or decrease, in potential on common line 403 as described above.

Upon each evaluation circuit 401 evaluating whether a bit in the first data packet changed state with respect to the bit in the same bit position in the second data packet received by hamming distance comparator 301, a hamming distance comparison may be performed as described below.

It is noted that method 600 may be executed in a different order presented and that the order presented in the discussion of FIG. 6 is illustrative. It is further noted that certain steps in FIG. 6 may be executed almost concurrently.

FIG. 7—Method for Performing Hamming Distance Comparison

FIG. 7 is a flowchart of one embodiment of the present invention of a method 700 for performing hamming distance comparison to implement bus inversion. It is noted that hamming distance comparison of the present invention may be implemented in other applications, e.g., image processing. It is further noted that embodiments performing hamming distance comparison of the present invention in other applications, e.g., image processing, would fall within the scope of the present invention.

Referring to FIG. 7, in conjunction with FIGS. 3–5, in step 701, upon each evaluation circuit 401 evaluating whether a bit changed state with respect to the state of the bit in a previously received data packet as described above, a determination may be made as to whether there is a net change in potential on common line 403 that shifts across, e.g., exceeds or falls below, a threshold. That is, a determination may be made as to whether the hamming distance, i.e., the number of non-matching bits in two consecutively received data packets, exceeds a particular number.

If there is a net change in potential on common line 403 that shifts across a threshold, then, in step 702, CTL comparator 402 is activated to assert a signal to toggle latch 302. By activating toggle latch 302, the state of its output, i.e., the state of the inversion bit, changes state as described above. Upon changing the state of the inversion bit, a complement value of each of the bits of the second data packet, e.g., binary values of 11111, may be transmitted in step 703 instead of the values received for each of the bits of the second data packet, e.g., binary values of 00000, since the hamming distance exceeded a particular number as described above. If the first data packet comprised the binary values of 11100, then by transmitting the complement binary values of 11111 instead of the true binary values of 00000 only two switches may be switched instead of three. Hence, switching activity may be minimized at least in part by transmitting the complement values of the received data bits instead of the true value of the data bits when the hamming distance exceeds a particular number.

If there is not a net change in potential on common line 403 that shifts across a threshold, then, in step 704, CTL comparator 402 is not activated to assert a signal to toggle latch 302. By not activating toggle latch 302, the state of its output, i.e., the state of the inversion bit, does not changes state as described above. By not changing the state of the inversion bit, the true value of each of the bits of the second data packet, e.g., binary values of 11111, may be transmitted in step 705 instead of the complement values for each of the bits of the second data packet since the hamming distance did not exceed a particular number as described above. If the first data packet comprised the binary values of 11100, then by transmitting the true binary values of 11111 instead of the complement binary values of 00000 only two switches may be switched instead of three. Hence, switching activity may be minimized at least in part by transmitting the true values of the received data bits instead of the complement value of the data bits when the hamming distance does not exceed a particular number.

It is noted that method 700 may be executed in a different order presented and that the order presented in the discussion of FIG. 7 is illustrative. It is further noted that certain steps in FIG. 7 may be executed almost concurrently.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for performing hamming distance comparison comprising the steps of:

receiving a first data packet, wherein said first data packet comprises a plurality of bits of data;

storing a first value at a first capacitor and a second value at a second capacitor, wherein said first value corresponds to a value of a first bit of said plurality of bits of data of said first data packet, wherein said second value corresponds to a complement value of said first bit of said plurality of bits of data of said first data packet;

receiving a second data packet, wherein said second data packet comprises said plurality of bits of data; and determining if a value at a second bit of said plurality of bits of data of said second data packet differs with said first value, wherein said second bit of said plurality of bits of data of said second data packet corresponds to a same bit position as said first bit of said plurality of bits of data of said first data packet;

wherein if said value at said first bit differs with said value at said second bit, then a net change of potential is produced on a common line of said first capacitor and said second capacitor.

2. The method as recited in claim 1, wherein if said value at said first bit does not differ with said value at said second bit, then said net change of potential is not produced on said common line of said first capacitor and said second capacitor.

3. The method as recited in claim 1 further comprising the step of:
   switching one of said first capacitor and said second capacitor if said value at said first bit differs with said value at said second bit.

4. The method as recited in claim 3 further comprising the step of:
   activating a comparator if said net change potential shifts a potential of said common line across a threshold value.

5. The method as recited in claim 4 further comprising the step of:
   asserting a signal to change a state of a toggle latch when said comparator is activated.

6. The method as recited in claim 5 further comprising the step of:
   transmitting a complement value of each of said plurality of bits of data of said second data packet if said comparator is activated.

7. A system, comprising:
   a plurality of evaluation circuits each configured to evaluate a state of a bit of data with respect to a previous state of said bit of data; and
   a comparator coupled to said plurality of evaluation circuits via a common line, wherein said comparator is configured to be asserted if said voltage of said common line shifts across a threshold voltage, wherein each of said plurality of evaluation circuits comprises:
      an input for receiving a first data packet and a second data packet, wherein said first data packet and said second data packet each comprises a plurality of bits of data;
      a first capacitor coupled to said input, wherein said first capacitor is configured to store a first value, wherein said first value corresponds to a value of a first bit of said plurality of bits of data of said first data packet; and
      a second capacitor coupled to said input, wherein said second capacitor is configured to store a second value, wherein said second value corresponds to a complement value of said first bit of said plurality of bits of data of said first data packet;
      wherein if a value at a second bit of said plurality of bits of data of said second data packet differs with said first value then a net change of potential is produced on said common line, wherein said second bit of said plurality of bits of data of said second data packet corresponds to a same bit position as said first bit of said plurality of bits of data of said first data packet.

8. The system as recited in claim 7, wherein if said value at said first bit does not differ with said value at said second bit, then said net change of potential is not produced on said common line.

9. The system as recited in claim 7, wherein one of said first capacitor and said second capacitor is switched if said value at said first bit differs with said value at said second bit.

10. The system as recited in claim 9 further comprising:
    a latch coupled to said comparator, wherein said latch is configured to generate a signal indicating whether a complement value of each of said plurality of bits of said second data packet is to be transmitted.

11. The system as recited in claim 10, wherein said comparator asserts a signal to change a state of said latch to indicate to transmit said complement value of each of said plurality of bits of said second data packet if said comparator is activated.

12. A system, comprising:
    an input for receiving a first data packet and a second data packet, wherein said first data packet and said second data packet comprises a plurality of bits of data;
    a first capacitor coupled to said input, wherein said first capacitor is configured to store a first value, wherein said first value corresponds to a value of a first bit of said plurality of bits of data of said first data packet; and
    a second capacitor coupled to said input, wherein said second capacitor is configured to store a second value, wherein said second value corresponds to a complement value of said first bit of said plurality of bits of data of said first data packet;
    wherein if a value at a second bit of said plurality of bits of data of said second data packet differs with said first value then a net change of potential is produced on a common line of said first and said second capacitor, wherein said second bit of said plurality of bits of data of said second data packet corresponds to a same bit position as said first bit of said plurality of bits of data of said first data packet.

13. The system as recited in claim 12, wherein if said value at said first bit does not differ with said value at said second bit, then said net change of potential is not produced on said common line of said first and said second capacitor.

14. The system as recited in claim 12, wherein one of said first capacitor and said second capacitor is switched if said value at said first bit differs with said value at said second bit.

15. The system as recited in claim 14 further comprising:
    a comparator coupled to said common line, wherein said comparator is configured to be asserted if said voltage of said common line shifts across a threshold voltage; and
    a latch coupled to said comparator, wherein said latch is configured to generate a signal indicating whether a complement value of each of said plurality of bits of said second data packet is to be transmitted.

16. The system as recited in claim 15, wherein said comparator asserts a signal to change a state of said latch to indicate to transmit said complement value of each of said plurality of bits of said second data packet if said comparator is activated.

17. A system, comprising:
    a first element;
    a second element;
    a hamming distance circuit; and
    a bus coupling said first element, said second element and said hamming distance circuit, wherein said hamming distance circuit is configured to perform bus inversion on said bus, wherein said hamming distance circuit comprises a hamming distance comparator configured to perform hamming distance comparison on packets of data transmitted from said first element to said second element, wherein said hamming distance comparator comprises:
       a plurality of evaluation circuits coupled to said bus, wherein each of said plurality of evaluation circuits is configured to evaluate a state of a bit of data with respect to a previous state of said bit of data; and
       a comparator coupled to said plurality of evaluation circuits via a common line, wherein said comparator is configured to be asserted if said voltage of said common line shifts across a threshold voltage, wherein each of said plurality of evaluation circuits comprises:

an input for receiving a first data packet and a second data packet, wherein said first data packet and said second data packet comprises a plurality of bits of data;

a first capacitor coupled to said input, wherein said first capacitor is configured to store a first value, wherein said first value corresponds to a value of a first bit of said plurality of bits of data of said first data packet; and a second capacitor coupled to said input, wherein said second capacitor is configured to store a second value, wherein said second value corresponds to a complement value of said first bit of said plurality of bits of data of said first data packet;

wherein if a value at a second bit of said plurality of bits of data of said second data packet differs with said first value then a net change of potential is produced on said common line, wherein said second bit of said plurality of bits of data of said second data packet corresponds to a same bit position as said first bit of said plurality of bits of data of said first data packet.

18. The system as recited in claim 17, wherein if said value at said first bit does not differ with said value at said second bit, then said net change of potential is not produced on said common line.

19. The system as recited in claim 17, wherein one of said first capacitor and said second capacitor is switched if said value at said first bit differs with said value at said second bit.

20. The system as recited in claim 19, wherein said hamming distance circuit further comprises:

a latch coupled to said comparator, wherein said latch is configured to generate a signal indicating whether a complement value of each of said plurality of bits of said second data packet is to be transmitted.

21. The system as recited in claim 20, wherein said comparator asserts a signal to change a state of said latch to indicate to transmit said complement value of each of said plurality of bits of said second data packet if said comparator is activated.

22. The system as recited in claim 20, wherein said hamming distance circuit further comprises a selection circuit coupled to said latch, wherein said selection circuit is configured to receive a value of each of said plurality of bits of said second data packet and said complement value of each of said plurality of bits of said second data packet, wherein said selection circuit is further configured to receive said signal indicating whether said complement value of each of said plurality of bits of said second data packet is to be transmitted.

23. The system as recited in claim 22, wherein said selection circuit is configured to select to transmit to said bus one of said value of each of said plurality of bits of said second data packet and said complement value of each of said plurality of bits of said second data packet.

24. The system as recited in claim 23, wherein said bus comprises an extra bit line to store said signal indicating whether said complement value of each of said plurality of bits of said second data packet is to be transmitted.

* * * * *